(12) United States Patent
Mathews et al.

(10) Patent No.: US 9,456,398 B2
(45) Date of Patent: *Sep. 27, 2016

(54) AUTO-DISCOVERY OF HOME AND OUT-OF-FRANCHISE NETWORKS

(71) Applicant: Verizon Patent and Licensing Inc., Arlington, VA (US)

(72) Inventors: Robin M. Mathews, Westford, MA (US); Tushar Saxena, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/330,118

(22) Filed: Jul. 14, 2014

(65) Prior Publication Data

US 2014/0321427 A1    Oct. 30, 2014

Related U.S. Application Data

(63) Continuation of application No. 12/975,919, filed on Dec. 22, 2010, now Pat. No. 8,782,269.

(51) Int. Cl.

| | |
|---|---|
| *H04W 36/24* | (2009.01) |
| *H04L 12/28* | (2006.01) |
| *H04W 4/00* | (2009.01) |
| *H04L 29/06* | (2006.01) |
| *H04N 21/414* | (2011.01) |
| *H04N 21/436* | (2011.01) |
| *H04N 21/4363* | (2011.01) |
| *H04N 21/442* | (2011.01) |

(Continued)

(52) U.S. Cl.
CPC .......... *H04W 36/24* (2013.01); *H04L 12/2812* (2013.01); *H04L 12/2838* (2013.01); *H04L 65/1083* (2013.01); *H04L 65/4084* (2013.01); *H04N 21/41407* (2013.01); *H04N 21/43615* (2013.01); *H04N 21/43637* (2013.01); *H04N 21/44227* (2013.01); *H04N 21/4622* (2013.01); *H04N 21/6131* (2013.01); *H04W 4/00* (2013.01); *H04L 2012/2841* (2013.01)

(58) Field of Classification Search
CPC ....................... H04L 65/4069–65/4092; H04L 12/2812–12/2838; H04L 2012/2841; H04L 65/1083; H04L 65/4084; H04N 21/41407; H04N 21/43615; H04N 21/43637; H04N 21/44227; H04N 21/4622; H04N 21/6131; H04W 36/24; H04W 4/00

See application file for complete search history.

(56) References Cited

U.S. PATENT DOCUMENTS

| | | | |
|---|---|---|---|
| 7,970,416 B2 * | 6/2011 | Kim ....................... | H04H 20/26 455/403 |
| 8,782,269 B2 | 7/2014 | Mathews et al. | |

(Continued)

*Primary Examiner* — Dung B Huynh

(57) ABSTRACT

A mobile device includes a mobile network module to present media content using a public network and a home network module to present media content from a home network. The mobile device uses the mobile network module to receive a media streaming session via a broadband cellular connection and detects a local wireless connection to a device in a home network. The mobile device uses the home network module to initiate, via the local wireless connection, a home media session with the device in the home network and matches content of the home media session with content of the media streaming session. The mobile device presents, to a user and using the home network module, the matched content of the home media session and disables the media streaming session.

20 Claims, 12 Drawing Sheets

(51) Int. Cl.
*H04N 21/462* (2011.01)
*H04N 21/61* (2011.01)

(56) References Cited

U.S. PATENT DOCUMENTS

| | | | |
|---|---|---|---|
| 2007/0129003 A1* | 6/2007 | Dunko | H04W 4/06 455/3.06 |
| 2007/0214484 A1* | 9/2007 | Taylor | H04H 60/80 725/100 |
| 2007/0254659 A1* | 11/2007 | Paul | H04W 72/005 455/436 |
| 2010/0138900 A1 | 6/2010 | Peterka et al. | |
| 2010/0202405 A1* | 8/2010 | Li | H04H 20/24 370/331 |
| 2010/0254370 A1 | 10/2010 | Jana et al. | |
| 2010/0284291 A1* | 11/2010 | Perras | H04H 20/24 370/252 |
| 2010/0296476 A1* | 11/2010 | Li | H04H 20/26 370/329 |
| 2011/0041155 A1* | 2/2011 | Wakabayashi | H04H 20/57 725/62 |
| 2011/0064049 A1* | 3/2011 | Jeon | H04H 20/24 370/331 |
| 2011/0292171 A1 | 12/2011 | Palm et al. | |
| 2012/0036248 A1 | 2/2012 | Naqvi et al. | |

\* cited by examiner

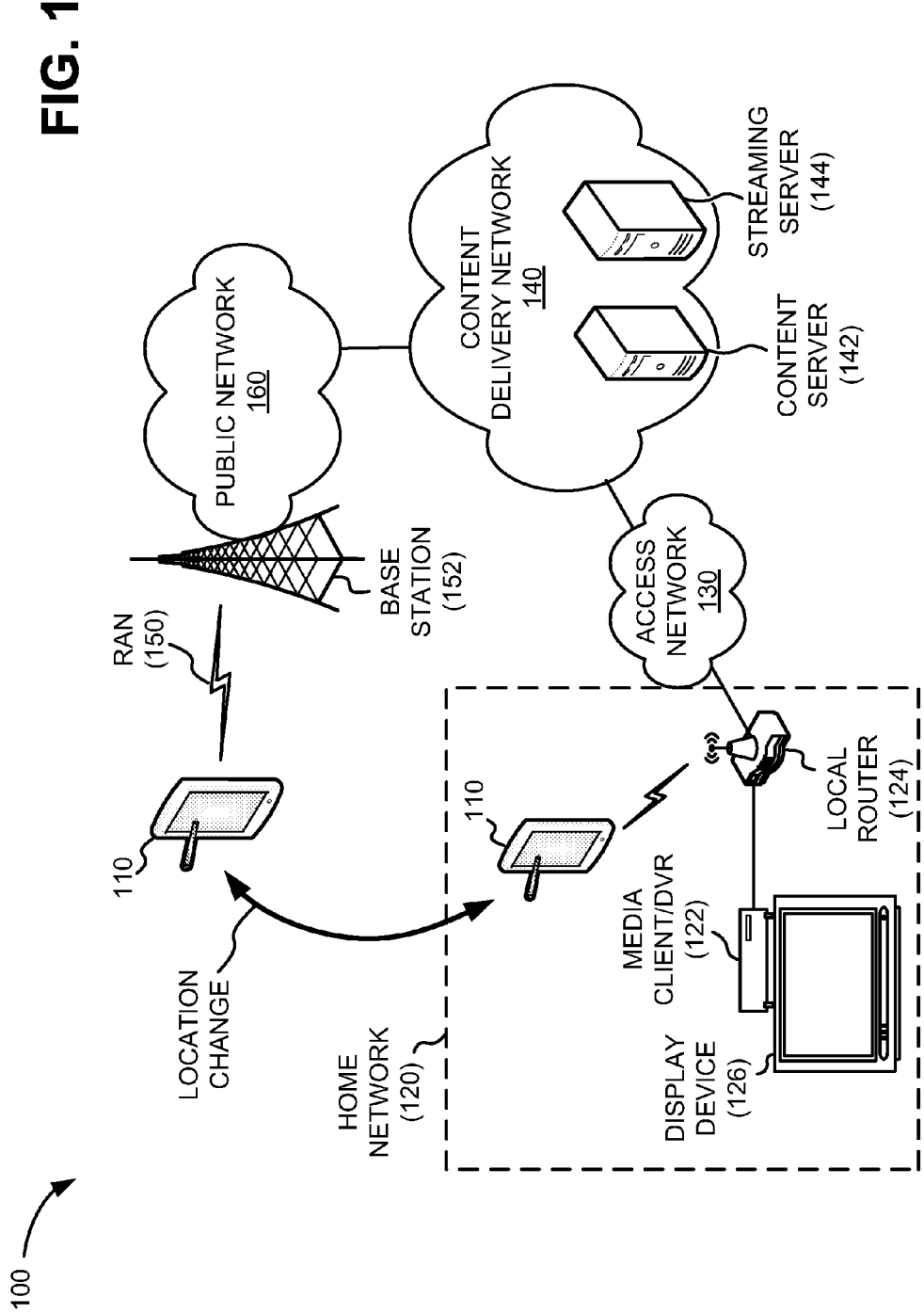

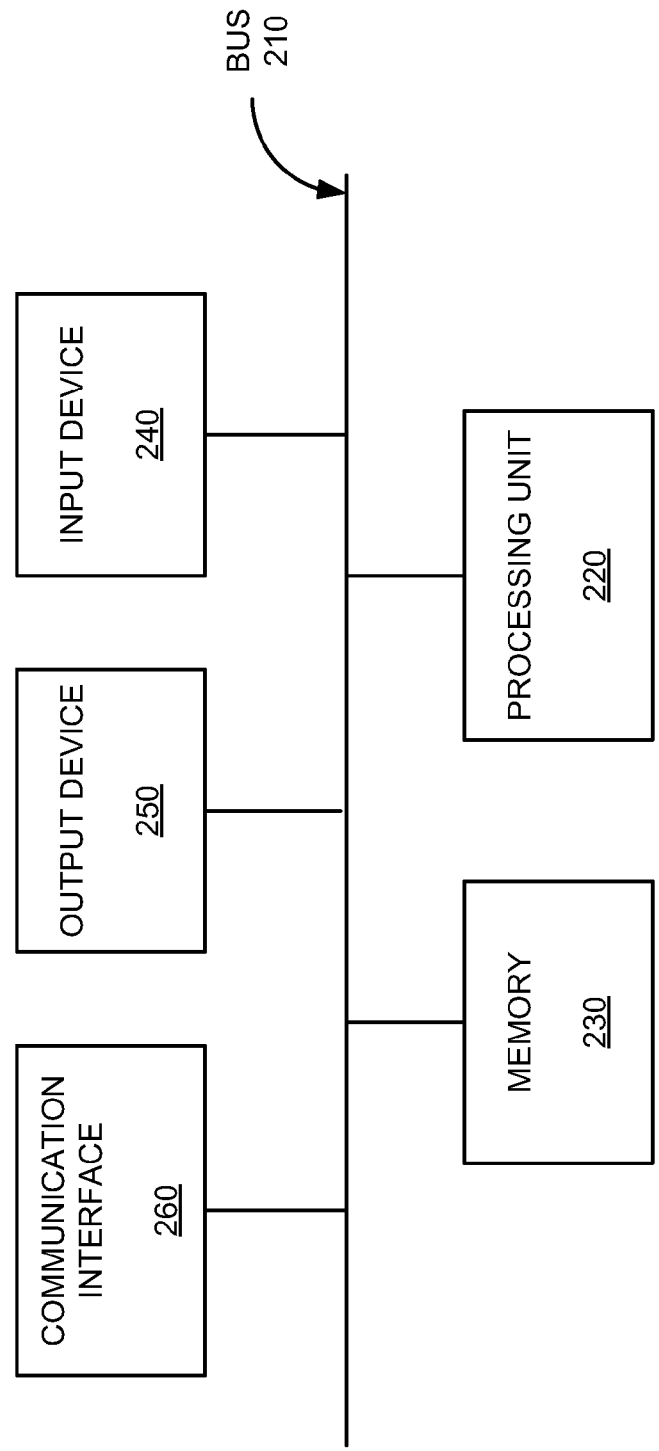

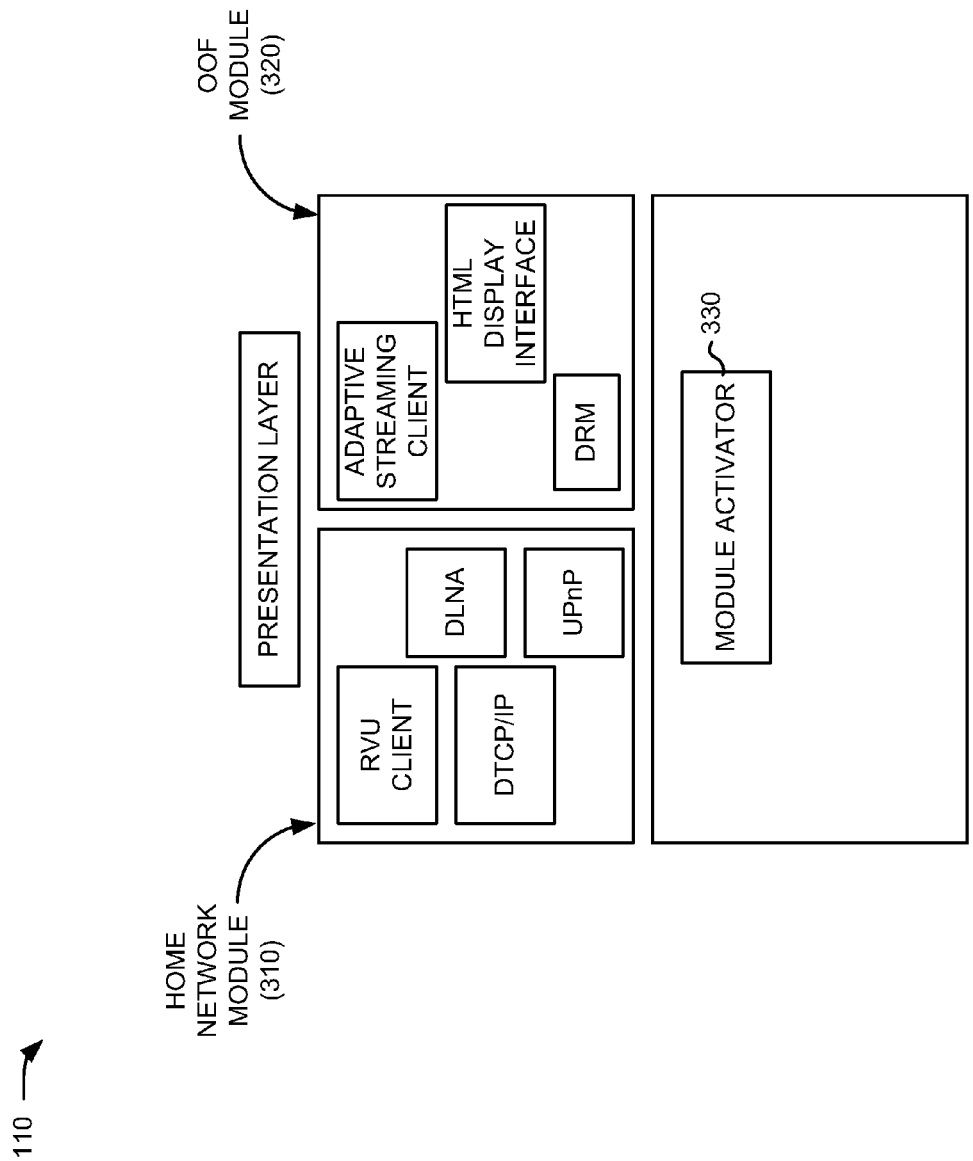

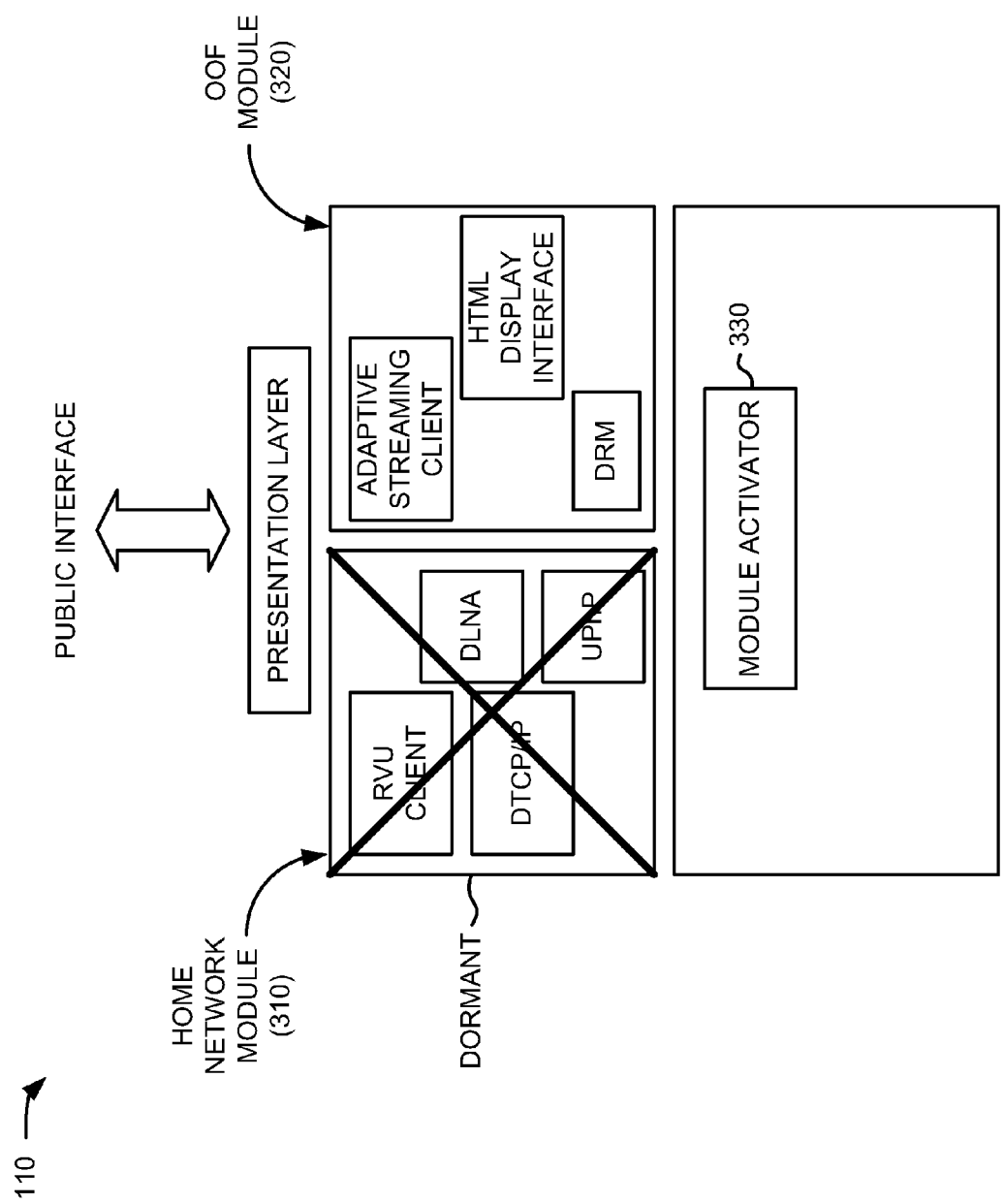

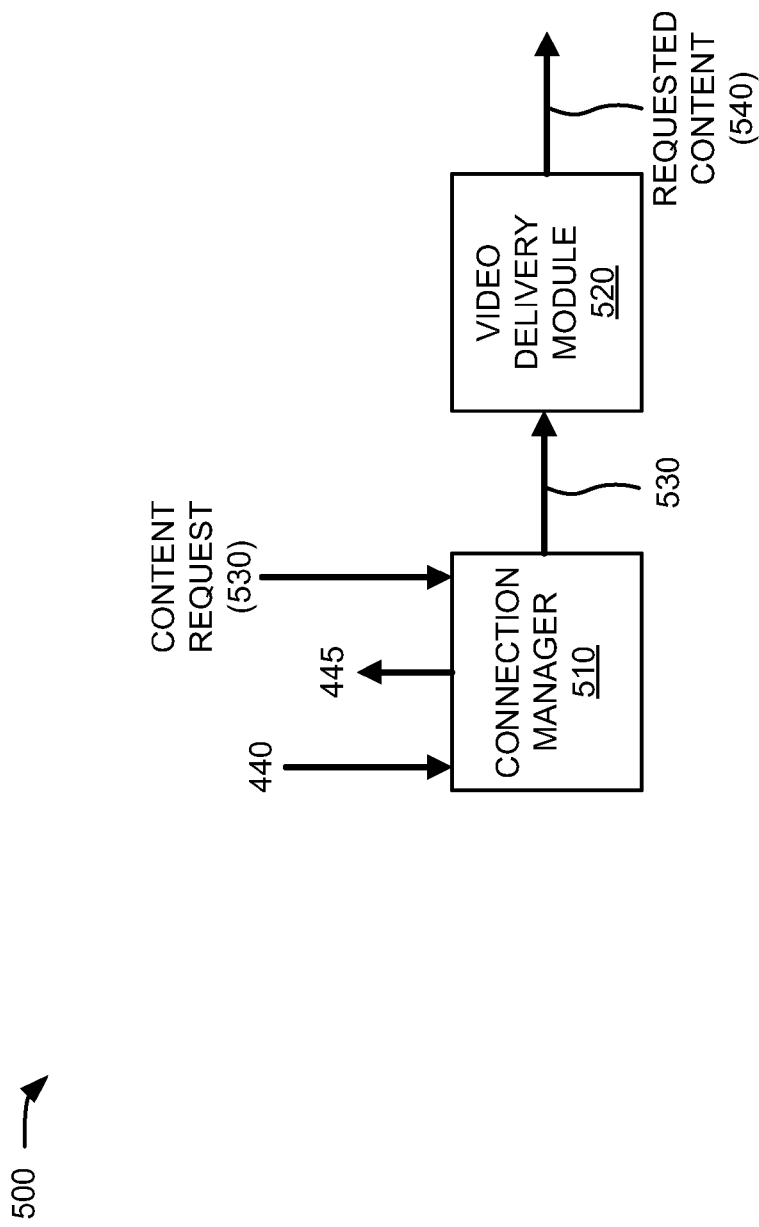

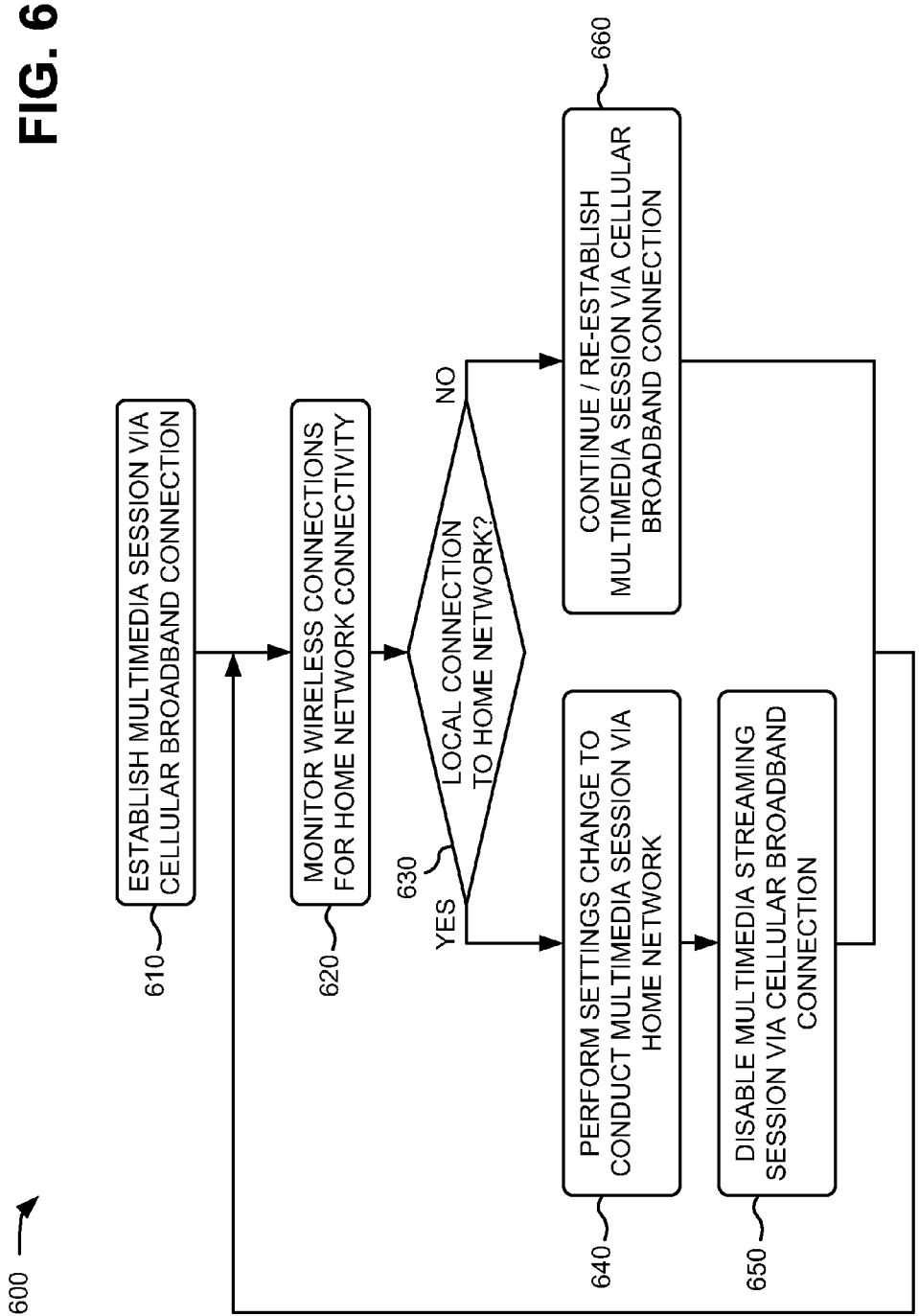

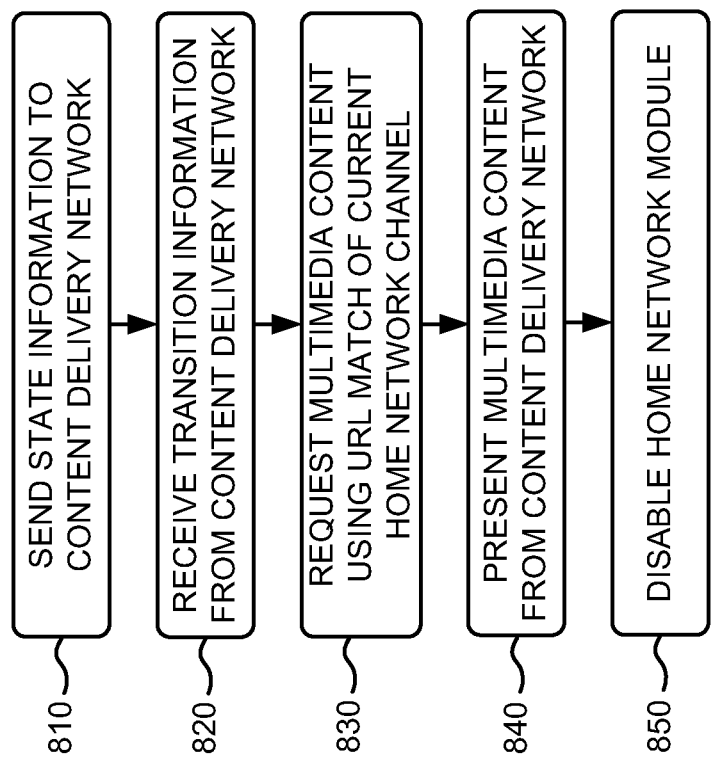

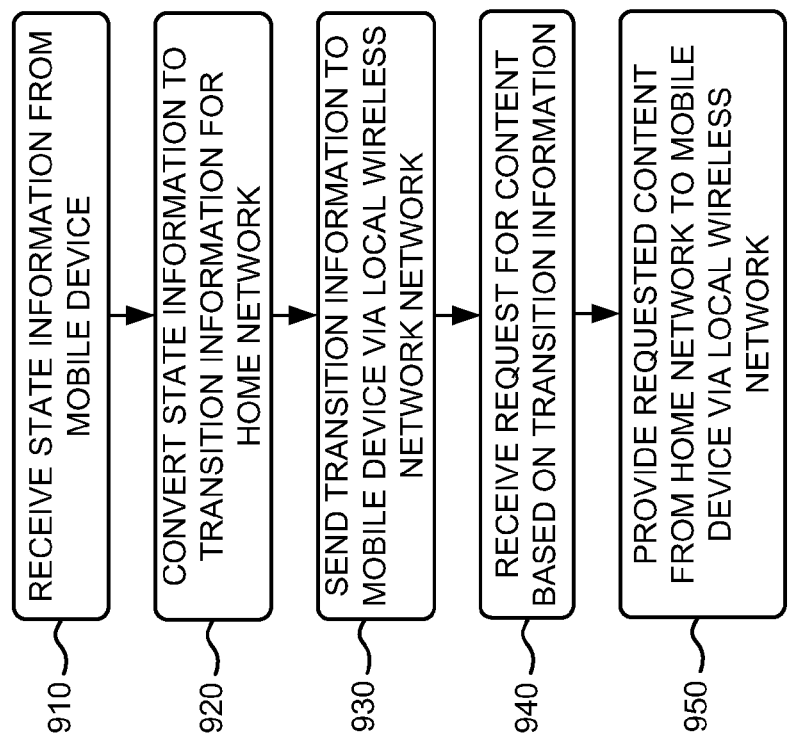

AUTO-DISCOVERY OF HOME AND OUT-OF-FRANCHISE NETWORKS

RELATED APPLICATION

This application is a continuation of U.S. patent application Ser. No. 12/975,919, filed Dec. 22, 2010, the disclosure of which is incorporated by reference herein in its entirety.

BACKGROUND

Mobile devices within home networks may connect to an access network to receive managed services (e.g., such as multimedia content provided with a guaranteed quality of service (QoS)) via a closed content distribution channel. The closed content distribution channel may be implemented through a subscription multimedia service providing wired network access to the home network through, for example a gateway, a home router, or a local set-top box.

When a user leaves the home network area, the mobile devices may rely on a cellular broadband network (e.g., a 3G, 4G, or another cellular broadband-type network) to provide services. The cellular broadband network may be referred to as an out-of-franchise network (OOF) network. While offering improvements over earlier generations of wireless networks, available bandwidth for today's cellular broadband networks remains lower than those available in a home network with wired connectivity. Thus, while full-featured services may be available via a home network, mobile devices using a cellular broadband network typically receive content that is "optimized" for the mobile experience (e.g., lower quality video, stripped-down graphical user interfaces, etc.).

BRIEF DESCRIPTION OF THE DRAWINGS

FIG. 1 is a diagram of an example network in which systems and/or methods described herein may be implemented;

FIG. 2 is a diagram of example components of a device that may correspond to one of the devices of the network depicted in FIG. 1;

FIGS. 3A-3C are diagrams of example functional components of a mobile device depicted in FIG. 1;

FIG. 5 is a diagram of example functional components of a media client/digital video recorder (DVR) depicted in FIG. 1;

FIGS. 6-8 are flow charts of an example process for performing dynamic service discovery according to an implementation described herein; and FIG. 9 is a flow chart of an example process for providing home network content to a mobile device according to an implementation described herein.

DETAILED DESCRIPTION OF PREFERRED EMBODIMENTS

Figure 3B:
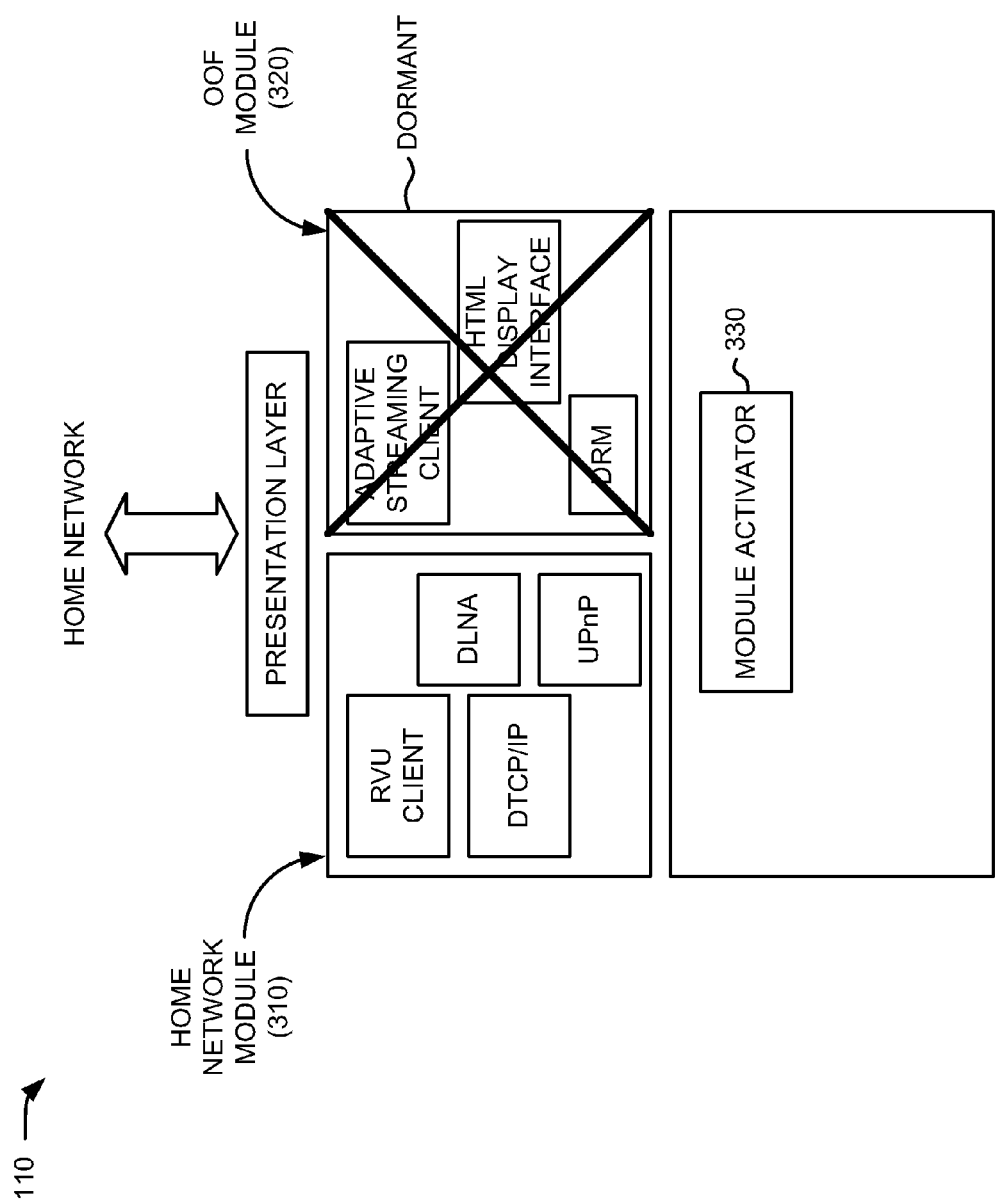

The following detailed description refers to the accompanying drawings. The same reference numbers in different drawings may identify the same or similar elements.

Systems and/or methods described herein may enable a mobile device to detect, and adapt operation modes, to provide higher quality services associated with a home network, in contrast with services provided through an out-of-franchise network. The mobile device may include a unified client that can play multimedia content (e.g., including video content) in a full-featured mode provided via the home network and in a mobile mode via an out-of-franchise network. In one implementation, the mobile device may automatically discover a home network service wherever available and may switch operation modes to provide the improved services (e.g., for the same content) available via the home network. Additionally, the mobile device may automatically detect the loss of the local wireless connection and may automatically return to streaming the same content through the out-of-franchise network.

In one implementation, a mobile device may include a mobile network module to present media content using a public network and a home network module to present media content from a home network. The mobile device may use the mobile network module to receive a media streaming session via a broadband cellular connection (e.g., a 3G or 4G network connection) and, later, may detect a local wireless connection (e.g., an IEEE 802.11 Wi-Fi connection) to a device, such as a digital video recorder (DVR), in a home network. The mobile device may use the home network module initiate, via the local wireless connection, a home media session with the device in the home network and may match content of the home media session to the content of the media streaming session. The mobile device may then present, to a user, the matched content of the home media session using the home network module and may disable the mobile network module and the media streaming session (e.g., from the broadband cellular connection).

As used herein, the term "user" is intended to be broadly interpreted to include a mobile device or a user of a mobile device.

FIG. 1 is a diagram of an example network 100 in which systems and/or methods described herein may be implemented. As illustrated, network 100 may include a mobile device 110, a home network 120, an access network 130, a content delivery network 140, a radio access network (RAN) 150, and a public network 160. Home network 120 may include a media client/DVR 122, a home router 124, and a display device 126. Content delivery network 140 may include a content server 142 and a streaming server 144. RAN 150 may include a base station 152.

Components of network 100 may interconnect via wired and/or wireless connections or links. A single mobile device 110, home network 120, media client/DVR 122, home router 124, display device 126, access network 130, content delivery network 140, content server 142, streaming server 144, RAN 150, base station 152, and public network 160 have been illustrated in FIG. 1 for simplicity. In practice, there may be more mobile devices 110, home networks 120, media client/DVRs 122, home routers 124, display devices 126, access networks 130, content delivery networks 140, content servers 142, streaming servers 144, radio RANs 150, base stations 152, and/or public networks 160.

Mobile device 110 may include a device capable of transmitting and receiving data (e.g., voice, text, images, and/or multimedia data) via home router 122 and over RAN 150. For example, mobile device 110 may be a self-contained data device, such as a mobile telephone, a smart phone, an electronic notepad, a personal digital assistant (PDA), a tablet (or "pad") computer, a laptop computer (e.g., with a wireless air card), a portable gaming device, or other types of computation or communication devices. Mobile device 110 may establish wireless communication sessions with home router 122 and/or base station 152 using different protocols. For example, mobile device 110 may connect to home router 122 using a Wi-Fi network (e.g., using IEEE 802.11 standards) and may connect to base station 152 using RAN 150 (e.g., using a broadband cellular network standard).

As described further herein mobile device 110 may also include multiple player modules (e.g., multimedia player applications and other associated applications). One of the player modules may play Internet protocol (IP) streaming content (e.g., content that continuously plays early in a download process without requiring a complete download in order to play content). Another player module may play richer content, such as content from home network 120 distributed using RVU protocols.

Home network 120 may include one or more devices connected to each other, and/or access network 130. Devices in home network 120 may include, for example, one or more set-top boxes (e.g., media client/DVR 122), local routers (e.g., local router 124), televisions (e.g., display device 126), personal computers, and/or mobile devices (e.g., mobile device 110). Home network 120 may also include other networking equipment and/or devices, such as additional media storage devices, a local gateway, cables, splitters, etc. (not shown). In an implementation, home network 120 may connect to content delivery network 140 (e.g., via access network 130) via a closed content distribution channel. The closed content distribution channel may include, for example, cable, optical fiber, satellite, or virtual private networks. In one implementation, home network 120 may receive video content and GUI information from content delivery network 140 via the closed content distribution channel.

Media client/DVR 122 may include any device capable of receiving, transmitting and/or processing information to and/or from access network 130. In one implementation, media client/DVR 122 may be a closed device (e.g., including a hardware/software configuration that is not accessible to the general public). Media client/DVR 122 may include decoding and/or decryption capabilities and may provide video signals to display device 126 and/or mobile device 110. Media client/DVR 122 may further include 3G DVR functionality, such as Wi-Fi connectivity. Media client/DVR 122 may be capable of sending data to and/or receiving data from mobile device 110, content server 142, other media clients 122, and/or other devices in home network 120. For example, media client/DVR 122 may be a RVU-compatible server to deliver multimedia within home network 120.

Local router 124 may include a device that acts as a wireless access point that employs one or more short-range wireless communication protocols for a wireless local area network (WLAN) and/or a wireless personal area network (WPAN). In one implementation, local router 124 may use an IEEE 802.11g/n (e.g., Wi-Fi) protocol and/or an IEEE 802.15 (e.g., Bluetooth) protocol. In another implementation, local router 124 may use a different short-range wireless protocol and/or a different set of frequencies. Local router 124 may provide connectivity between equipment within home network 120 and between the home network 120 and an external network (e.g., access network 130), and may also include one or more wired (e.g., Ethernet, TIA Cat 3 cable, etc.) connections. In one implementation, functions of media client/DVR 122 and local router 124 may be combined.

Display device 126 may include any device capable of receiving and reproducing video signals. In one implementation, display device 126 may include a television. In another implementation, display device 126 may include, for example, a display of a stationary communication device (e.g., a computer monitor or a telephone), or a display of a portable communication device (e.g., a mobile telephone or a PDA).

Access network 130 may provide customers with multimedia content provided, for example, by content delivery network 140. Generally, access network 130 may provide superior connection speeds (and, thus, potential for higher quality services) when compared to RAN 150. Access network 130 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 130 may include a number of separate networks that function to provide services to home network 120. In one implementation, access network 130 may terminate at home network 120 via an optical communication link, such as an optical fiber provided to home network 120. In another possible implementation, access network 130 may terminate at home network 120 via a coaxial cable. In still another implementation, access network 130 may terminate at home network 120 via a wireless (e.g., satellite) connection.

Content delivery network 140 may include a network-based storage cloud of content, such as broadcast television content, personal video content, public video content, and/or other multimedia content. Content delivery network 140 may include a computer system, a cable head-end, and/or a broadcasting device capable of providing video content in a variety of formats, instructions, and/or other information. Content delivery network 140 may include, for example, one or more servers (e.g., content server 142) and/or databases to temporarily store and provide content that is the subject of a content request from media client/DVR 122 and/or mobile device 110. Content delivery network 140 may also include one or more transcoding servers that may transcode (or convert) video content to a format that mobile device 110 may utilize (e.g., playback).

Content server 142 may include one or more server devices, or other types of computation or communication devices, that gather, process, search, and/or provide information in a manner described herein. In one implementation, content server 142 may include a computer system, a server device, a cable head-end, and/or a broadcasting device capable of providing data (e.g., video content, applications, file downloads, advertising, instructions, images, voice content (e.g., voice over IP (VoIP)), application data, and/or other information) to mobile device 110 (e.g., via media client/DVR 122 and/or local router 124).

Streaming server 144 may include a server device, such as a computer device, and/or a network device, such as a router, that provides streaming data packets to mobile device 110 (e.g., when mobile device 110 is connected to RAN 150). Streaming server 144 may include multiple devices (e.g., where each device supports multiple video streams) that are capable of communicating with mobile device 110 (e.g., via RAN 150) and with the Internet (e.g., public network 160). In one implementation, after mobile device 110 is authenticated, streaming server 144 may securely stream video content (e.g., a streaming uniform resource locator (URL)) directly to mobile device 110. Streaming server 144 may receive a request for streaming content from mobile device 110 and may continue to provide streaming content to mobile device 110 until particular requested content is received or mobile device 110 terminates a connection with streaming server 144.

RAN 150 may include one or more devices for transmitting voice and/or data to mobile device 110 and public network 160. In one example implementation, RAN 150 may include a group of base stations (e.g., base station 152) and a group of radio network controllers (not shown). In one example, RAN 150 may provide a wireless access network for mobile device 110. The wireless access network may correspond to a broadband cellular network, such as a long-term evolution (LTE) network, an enhanced high-rate packet data (eHRPD) network, a WiMax network, etc.

Base station 152 (also referred to as a "Node B") may include one or more devices that receive voice and/or data from RAN 150 and transmit that voice and/or data to mobile device 110 via an air interface. Base station 152 may also include one or more devices that receive voice and/or data from mobile device 110 over an air interface and transmit that voice and/or data to RAN 150 or other mobile devices 110.

Public network 160 may include a WAN, an intranet, a telephone network (e.g., the Public Switched Telephone Network), or a combination of networks. Public network 160 may include, for example, an untrusted network, such as the Internet. Public network 160 may further include transport and/or network devices such as routers, switches, and/or firewalls.

In an implementation described herein, mobile device 110 may include capabilities to automatically discover a home network service whenever mobile device is within range of a signal (e.g., from local router 124) from home network 120. If mobile device 110 discovers the home network service, mobile device 110 may default to using a WLAN signal from local router 124 to receive full-featured content from content delivery network 140 (e.g., via access network 130). Mobile device 110 may activate a RVU module to present (e.g., play) the full-featured content from content delivery network 140. If mobile device 110 is receiving video content out-of-franchise (e.g., from content delivery network 140 via RAN 150) at the time mobile device 110 discovers the home network service, mobile device 110 may exchange information with media client/DVR 122 to tune to the same programming the user was watching (via RAN 150) except through home network 120 with a higher quality video services. For example, media client/DVR 122 may provide high-definition (HD) programming to mobile device 110 for video content that was being provided as standard definition over RAN 150.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

FIG. 2 is a diagram of example components of a device 200 that may correspond to one or more of mobile device 110, media client/DVR 122, content server 142, and streaming server 144. Each of mobile device 110, media client/DVR 122, content server 142, and streaming server 144 may include one or more device 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIGS. 3A-3C are diagrams of example functional components of mobile device 110. In one implementation, the functions described in connection with FIGS. 3A-3C may be performed by one or more components of device 200 (FIG. 2). As illustrated, mobile device 110 may include a home network module 310, an out-of-franchise (OOF) module 320, and a module activator 330.

Referring to FIG. 3A, home network module 310 may include hardware or a combination of hardware and software to present video content provided through media client/DVR 122. In one implementation, home network module 310 may include one or more applications to present high quality video and/or services on mobile device 110. For example, home network module 310 may include a RVU client, a Digital Transmission Content Protection/Internet Protocol (DTCP/IP) component, a Digital Living Network Alliance (DLNA) component, and/or a Universal Plug and Play (UPnP) component to implement RVU protocols (e.g., as established by the RVU Alliance). Generally, RVU protocols may allow mobile device 110 to receive a pixel accurate display of a user interface and video content available to media client/DVR 122 (and typically presented on display device 126). In other implementations, home network module 310 may use other standards/protocols to present high quality video and/or services on mobile device 110. The DTCP/IP component may provide digital rights management and protection against unauthorized copying. The DLNA component and the UPnP enable device-to-device interoperability within home network 120.

Out-of-franchise (00F) module 320 (also referred to as a mobile network module) may include hardware or a combination of hardware and software to present IP streaming video provided via RAN 150. In one implementation, out-of-franchise module 320 may include one or more applications to present streaming video and/or services on mobile device 110. For example, out-of-franchise module 320 may include an adaptive streaming client, a HTML display interface, and a Digital Rights Management (DRM) component. The adaptive streaming client may include a media player that plays streaming content. The HTML display interface may include an interface to present interactive menus to select video content, and the DRM component may provide digital rights management and protection against unauthorized copying of the video content. Out-of-franchise module 320 may access content delivery network 140 via RAN 150 and public network 160 to request video content. Streaming server 144 may provide a streaming URL to user device 110. User device 110 may receive the streaming URL, and may begin streaming from the URL using out-of-franchise module 320. The streaming URL may be exposed to public network 160 (e.g., the Internet) and RAN 120, which may limit the quality of services able to be provide via the streaming URL.

Module activator 330 may include hardware or a combination of hardware and software to selectively activate home network module 310 and out-of-franchise module 320 based on the type of video service available to mobile device 110. For example, as shown in FIG. 3B, module activator 330 may activate home network module 310 and place out-of-franchise module 320 in a dormant mode when mobile device 110 is able to receive services from home network 120. Conversely, as shown in FIG. 3C, module activator 330 may activate out-of-franchise module 320 and place home network module 310 in a dormant mode when mobile device 110 is only able to receive services via a public interface (e.g., using RAN 150).

Although FIGS. 3A-3C show example functional components of mobile device 110, in other implementations, mobile device 110 may contain fewer functional components, different functional components, differently arranged functional components, or additional functional components than depicted in FIG. 3. Alternatively, or additionally, one or more functional components of mobile device 110 may perform one or more other tasks described as being performed by one or more other functional components of mobile device 110.

Figure 4A:
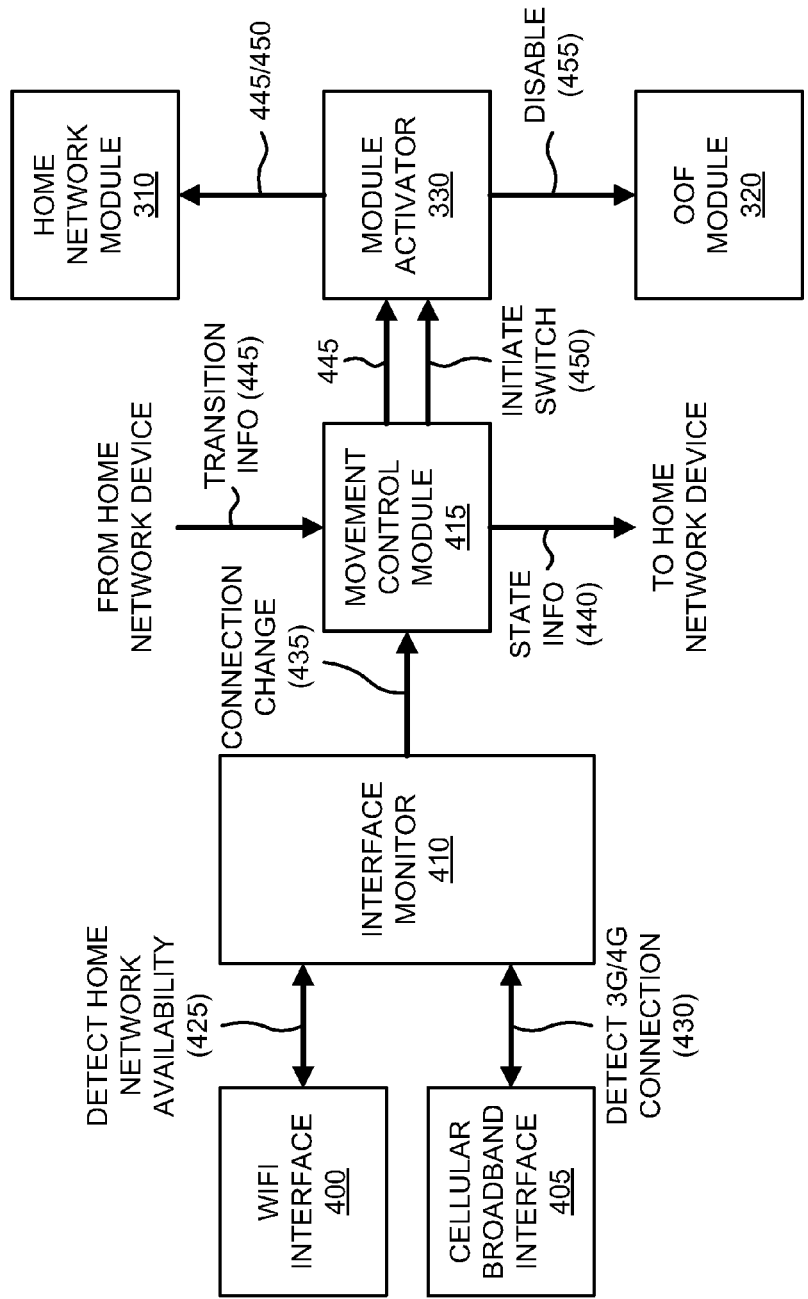
FIGS. 4A and 4B are diagrams of additional further example functional components of the mobile device depicted in FIG. 1.
Figure 4B:
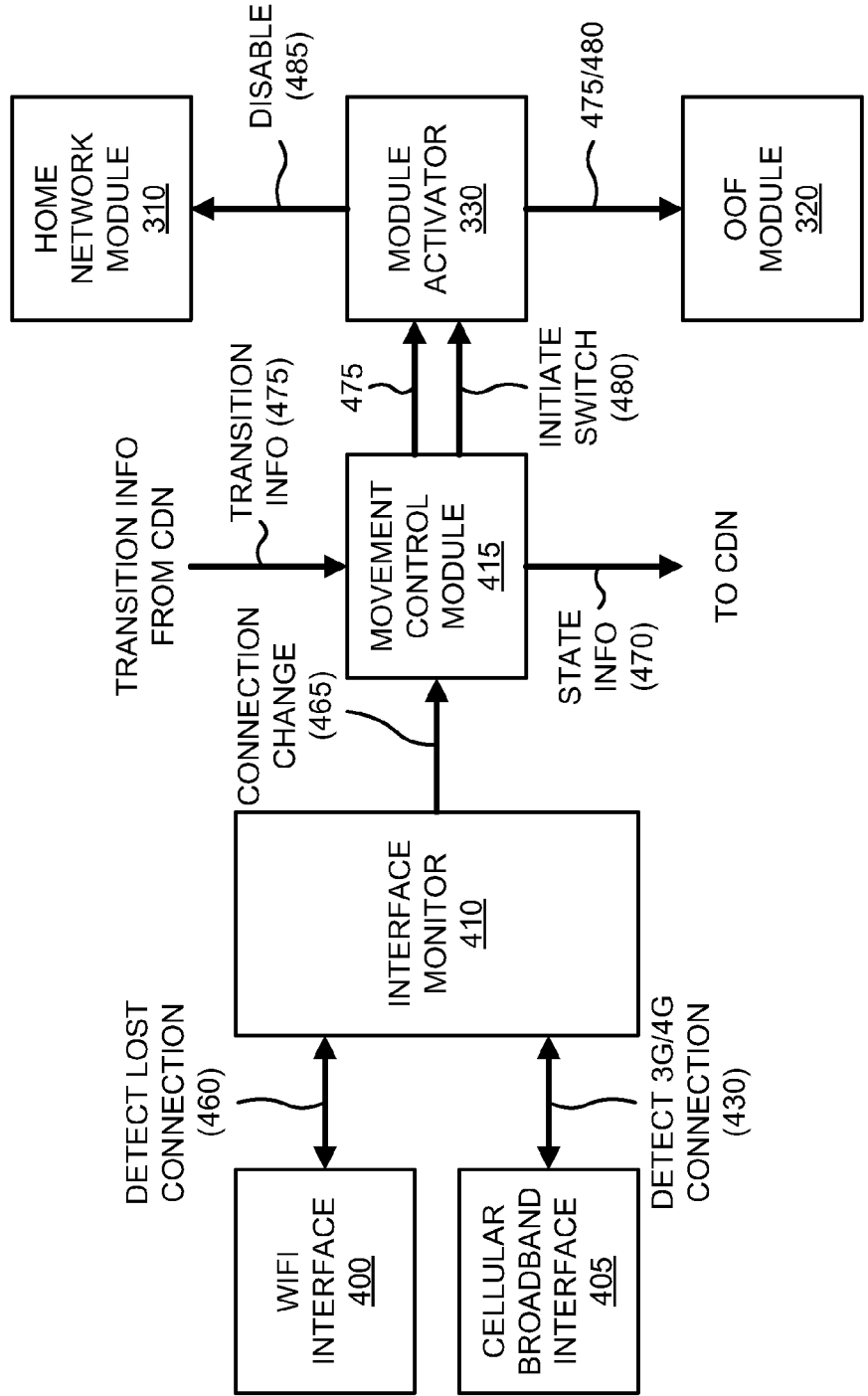

FIGS. 4A and 4B are diagrams of additional example functional components of mobile device 110. In one implementation, the functions described in connection with FIGS. 4A and 4B may be performed by one or more components of device 200 (FIG. 2). As shown in FIGS. 4A and 4B, mobile device may include home network module 310, out-of-franchise module 320, module activator 330, a Wi-Fi interface 400, a cellular broadband interface 405, an interface monitor 410, and a movement control module 415. Home network module 310, out-of-franchise module 320, and module activator 330 may include the features described above in connection with, for example, FIGS. 3A-3C.

Wi-Fi interface 400 may include a communications interface (e.g., communication interface 260) using conventional protocols to enable a two-way Wi-Fi connection. In one implementation, Wi-Fi interface 400 may receive a discovery signal from media player/DVR 122 and/or local router 124 to allow Wi-Fi interface 400 to identify home network 120. In one implementation, the discovery signal may include proprietary protocols to identify media player/DVR 122 and/or local router 124 as being associated with home network 120 for purposes of enabling mobile device 110 to send/receive signals from media player/DVR 122 and/or local router 124. In other implementations, Wi-Fi interface 400 may include another short-range wireless communication interface, such as a Bluetooth interface.

Cellular broadband interface 405 may include a communications interface (e.g., communication interface 260) using conventional protocols to enable a two-way cellular broadband connection. Cellular broadband interface 405 may implement for example LTE, eHRPD, and/or WiMax standards.

Interface monitor 410 may determine if Wi-Fi interface 400 has a connection to home network 120 and/or if cellular broadband interface 405 has an out-of-franchise connection. Interface monitor 410 may also provide instructions to movement control module 415 to change a connection (e.g., for receiving video content) based on a determination of an available connection.

As shown in FIG. 4A, interface monitor 410 may detect home network availability 425 from Wi-Fi interface 400. For example, Wi-Fi interface 400 may report discovery signals (e.g., received from media player/DVR 122 and/or local router 124) or an existing Wi-Fi connection to interface monitor 410. Interface monitor 410 may also detect a 3G/4G connection 430 from cellular broadband interface 405. Assume in FIG. 4A, that mobile device 110 is using an existing 3G/4G connection to present streaming video to a user. Based on detection of home network availability 425, interface monitor 410 may provide a connection change signal 435 to movement control module 415.

Movement control module 415 may receive connection change signal 435 and may establish a connection (if necessary) with a content provider. For example, if a device in home network 120 (e.g., media player/DVR 122 and/or local router 124) is discovered, but not connected, movement control module 415 may automatically initiate a Wi-Fi connection with home network 120. Movement control module 415 may also provide information to effect a seamless transition (e.g., for the user) from viewing video content via cellular broadband interface 405 to viewing the video content via Wi-Fi interface 400 and home network 120. For example, as shown in FIG. 4A, movement control module 415 may send state information 440 to a home network device (e.g., media player/DVR 122 and/or local router 124). State information 440 may be in the form of a cookie that contains information regarding where the mobile terminal 110 (e.g., out-of-franchise module 320) is in terms of user experience, channel being watched, etc.

Movement control module 415 may receive, from the home network device, transition information 445. For example, based on state information 440, media player/DVR 122 and/or local router 124 may provide transition information 445. Transition information 445 may include, for example, a channel identifier to tune to the home network or a particular GUI to display (e.g., that corresponds to a channel and/or GUI in state information 440). Movement control module 415 may provide transition information 445 to player module activator and may provide instructions to initiate a switch (e.g., from out-of-franchise module 320 to home network module 310), as indicated by reference number 450.

Module activator 330 may selectively activate/deactivate home network module 310 and out-of-franchise module 320 based on instructions from movement control module 415. Module activator 330 may receive transition information 445 and initiate switch signal 450. Based on signals 445/450, module activator 330 may activate home network module 310 to begin receiving video content from home network 120 (e.g., via Wi-Fi interface 400) on the channel previously being streamed by out-of-franchise module 320. In conjunction with activating home network module 310, module activator 330 may also disable out-of-franchise module 320, as indicated by reference number 455. For example, module activator 330 may disable out-of-franchise module 320 when home network module 310 begins to receive video content.

Referring to FIG. 4B, assume a user leaves the area of home network 120 and a Wi-Fi connection with home network 120 is lost. As shown in FIG. 4B, interface monitor 410 may detect a lost connection 460 from Wi-Fi interface 400. Interface monitor 410 may also detect (or continue to detect) 3G/4G connection 430 from cellular broadband interface 405. Based on detection of lost connection 460, interface monitor 410 may provide a connection change signal 465 to movement control module 415.

Movement control module 415 may receive connection change signal 465 and may establish a connection (if necessary) with content delivery network 140 (e.g., content server 142). In one implementation, movement control module 415 may also provide information to effect a seamless transition (e.g., for the user) from viewing video content via Wi-Fi interface 400 to viewing the video content via cellular broadband interface 405. For example, as shown in FIG. 4B, movement control module 415 may send state information 470 to content delivery network 140 (e.g., content server 142 and/or streaming server 144). State information 470 may be in the form of a cookie that contains information regarding where the mobile terminal 110 (e.g., home network module 310) is in terms of user experience, channel being watched, etc.

Movement control module 415 may receive, from content delivery network 140, transition information 475. For example, based on state information 470, content server 142 and/or streaming server 144 may provide transition information 475. Transition information 475 may include, for example, a URL to select from content delivery network 140 or a particular GUI to display (e.g., that corresponds to a channel and/or GUI in state information 470). Movement control module 415 may provide transition information 475 to player module activator and may provide instructions to initiate a switch (e.g., from home network module 310 to out-of-franchise module 320), as indicated by reference number 480.

Module activator 330 may receive transition information 475 and initiate switch signal 480 and may activate out-of-franchise module 320 to begin receiving video content from content delivery network 140 (e.g., via cellular broadband interface 405) on the channel previously being viewed via Wi-Fi interface 400. In conjunction with activating out-of-franchise module 320, module activator 330 may also disable home network module 310, as indicated by reference number 485.

Although FIGS. 4A and 4B show example functional components of mobile device 110, in other implementations, mobile device 110 may include fewer functional components, different functional components, differently arranged functional components, and/or additional functional components than depicted in FIGS. 4A and 4B. Alternatively, or additionally, one or more functional components of mobile device 110 shown in FIGS. 4A-4B may perform one or more other tasks described as being performed by one or more other functional components of mobile device 110 shown in FIGS. 4A and 4B.

FIG. 5 is a diagram of example functional components of a device 500 that may correspond to, for example, media client/DVR 122. In one implementation, the functions described in connection with FIG. 5 may be performed by one or more components of device 200 (FIG. 2). As shown in FIG. 5, device 500 may include a connection manger 510 and a video delivery module 520.

Connection manager 510 may receive information from mobile device 110 and may provide the information to mobile device 110 to allow a seamless transition (e.g., for the user) from viewing video content via cellular broadband interface 405 to viewing video content via Wi-Fi interface 400 and home network 120. For example, connection manager 510 may receive state information 440 from mobile device 110 that indicates a current channel, GUI, and/or other information currently being presented on mobile device 110. Connection manager 510 may translate state information 440 into information that may be used by mobile device 110 to switch to equivalent content (e.g., with higher quality) from home network 120. For example, connection manager 510 may perform a channel matching procedure to match the URL of a video stream (e.g., included in state information 440) with a particular channel associated with media player/DVR 122. Connection manager 510 may provide the translated state information back to mobile device 110 as transition information 445.

Based on transition information 445, connection manager 510 may receive, from mobile device 110, content request 530 to provide content to mobile device 110. Content request 530 may include, for example, a particular channel to tune to and/or a particular GUI to display. Connection manager 510 may provide content request 530 to video delivery module 520.

Video delivery module 520 may provide video content to mobile device 110 (e.g., via a Wi-Fi connection). In one implementation, video delivery module 520 may function as a RVU-compliant media server. For example, video delivery module 520 may provide high resolution video content to mobile device 110 and/or may provide a user guide experience specific to the look and feel of a home network television display. Video delivery module 520 may receive content request 530 and may provide the requested content to mobile device 110, as indicated by reference number 540.

Although FIG. 5 shows example functional components of media player/DVR 122, in other implementations, media player/DVR 122 may include fewer functional components, different functional components, differently arranged functional components, and/or additional functional components than depicted in FIG. 5. Alternatively, or additionally, one or more functional components of media player/DVR 122 may perform one or more other tasks described as being performed by one or more other functional components of media player/DVR 122.

FIGS. 6-8 are flow charts of an example process 600 for performing dynamic service discovery according to an implementation described herein. In one example implementation, process 600 may be performed by mobile device 110. In another implementation, some or all of process 600 may be performed by mobile device 110 in conjunction with, for example, media player/DVR 122.

Process 600 may include establishing a multimedia session via a cellular broadband connection (block 610), monitoring a wireless connection for home network connectivity (block 620), and determining if there is an available local connection to the home network (block 630). For example, as described above in connection with FIG. 4A, mobile device 110 may use an existing 3G/4G connection to present streaming video to a user. Mobile device 110 (e.g., interface monitor 410) may determine if Wi-Fi interface 400 has a connection to home network 120 and/or if cellular broadband interface 405 has an out-of-franchise connection.

If there is an available local connection to the home network (block 630—YES), process 600 may include performing a settings change to conduct the multimedia session via the home network (block 640), and disabling the multimedia session via the cellular broadband connection (block 650). For example, as described above in connection with FIG. 4A, mobile device 110 (e.g., interface monitor 410) may detect home network availability 425 from Wi-Fi interface 400. Wi-Fi interface 400 may, for example, report discovery signals (e.g., received from media player/DVR 122 and/or local router 124) or an existing Wi-Fi connection to interface monitor 410. Based on detection of home network availability 425, interface monitor 410 may provide a connection change signal 435 to movement control module 415 to switch the existing 3G/4G-based video session to a home network-based video session.

If there is not an available local connection to the home network (block 630—NO), process 600 may include continuing and/or reestablishing the multimedia session via the cellular broadband connection (block 660). For example, mobile device 110 may continue the existing 3G/4G-based video session as long as no local connection to home network 120 is available. Also, if the 3G/4G-based video session was previously terminated (e.g., by actions of mobile device 110 to switch to the local home network connection), mobile device 110 (e.g., out-of-franchise module 320) may reestablish a 3G/4G-based connection.

Process block 640 may include the process blocks depicted in FIG. 7. As shown in FIG. 7, process block 640 may include sending state information to a home network device (block 710), receiving transition information from the home network device (block 720), tuning to a matching channel from the multimedia session (block 730), and presenting the multimedia content from the home network device (block 740). For example, as described above in connection with FIG. 4A, mobile device 110 (e.g., movement control module 415) may send state information 440 to a home network device (e.g., media player/DVR 122 and/or local router 124). State information 440 may include information regarding where the mobile terminal 110 (e.g., out-of-franchise module 320) is in terms of user experience, channel being watched, etc. Movement control module 415 may receive, from the home network device, transition information 445, such as a channel identifier to tune to on the home network or a particular GUI to display (e.g., that corresponds to a channel and/or GUI in state information 440). Module activator 330 may activate home network module 310 to begin receiving video content from home network 120 (e.g., via Wi-Fi interface 400) on the channel previously being streamed by out-of-franchise module 320. In conjunction with activating home network module 310, module activator 330 may also disable out-of-franchise module 320, as indicated by reference number 455.

Process block 660 may include the process blocks depicted in FIG. 8. As shown in FIG. 8, process block 660 may include sending state information to a content delivery network (block 810), receiving transition information from the content delivery network (block 820), requesting multimedia content using a URL match of the current home network channel (block 830), presenting the multimedia content from the content delivery network (block 840), and disabling the home network module (block 850). For example, as described above in connection with FIG. 4B, mobile device 110 (e.g., interface monitor 410) may provide a connection change signal 465 to movement control module 415. Movement control module 415 may receive connection change signal 465 and may provide state information 470 to content delivery network 140 (e.g., content server 142 and/or streaming server 144). State information 470 may include information regarding where the mobile terminal 110 (e.g., home network module 310) is in terms of user experience, channel being watched, etc. Movement control module 415 may receive, from content delivery network 140, transition information 475 that may include, for example, a URL to select from content delivery network 140 or a particular GUI to display (e.g., that corresponds to a channel and/or GUI in state information 470). Module activator 440 may activate out-of-franchise module 320 to begin receiving video content from content delivery network 140 (e.g., via cellular broadband interface 405) on the channel previously being viewed by Wi-Fi interface 400. In conjunction with activating out-of-franchise module 320, module activator 330 may also disable home network module 310, as indicated by reference number 485.

FIG. 9 is a flow chart of an example process 900 for providing home network content to a mobile device according to an implementation described herein. In one implementation, process 900 may be performed by media client/DVR 122. In another implementation, some or all of process 900 may be performed by media client/DVR 122 in conjunction with, for example, mobile device 110, local router 124, or a another device within or outside of home network 120.

Process 900 may include receiving state information from a mobile device (block 910). For example, as described above in connection with FIG. 5, media client/DVR 122 (e.g., connection manager 510) may receive state information 440 from mobile device 110 that indicates a current channel, GUI, and/or other information currently being presented on mobile device 110.

Process 900 may include converting the state information to transition information for a home network (block 920), and sending the transition information to the mobile device via a local wireless network (block 930). For example, as described above in connection with FIG. 5, media client/DVR 122 (e.g., connection manager 510 may translate state information 440 into information that may be used by mobile device 110 to switch to equivalent content (e.g., with higher quality) from home network 120. For example, connection manager 510 may perform a channel matching procedure to match the URL of a video stream (e.g., included in state information 440) with a particular channel associated with media player/DVR 122. Connection manager 510 may provide the translated state information back to mobile device 110 (e.g., via a Wi-Fi connection to Wi-Fi interface 400) as transition information 445.

Process 900 may include receiving a request for content based on the transition information (block 940) and providing the requested content from the home network to the mobile device via the local wireless network (block 950). For example, as described above in connection with FIG. 5, based on transition information 445, connection manager 510 may receive, from mobile device 110, content request 530 to provide content to mobile device 110. Content request 530 may include, for example, a particular channel to tune and/or a particular GUI to display. Video delivery module 520 may provide the requested video content to mobile device 110 (e.g., via the Wi-Fi connection to Wi-Fi interface 400).

Systems and/or methods described herein may enable a mobile device to detect, and adapt operation modes, to provide higher quality services associated with home network, in contrast with of services provided through an out-of-franchise network. The mobile device may include a unified client that can play multimedia content (e.g., including video content) in a full-featured mode provided via the home network and in a mobile mode via an out-of-franchise network. In one implementation, the mobile device may automatically discover home network service wherever available and may switch operation modes from streaming video content via a broadband cellular network to receiving the same video content (e.g., with a higher quality) from a home network device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" or a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a first device, content,
      the content being received from a first network,
      the content being watched by a user of the first device;
   determining, by the first device and while receiving the content, if a second network is available,
      the second network being different than the first network;
   changing, by the first device and when the second network is available, at least one setting of the first device to establish a connection with the second network,
      changing the at least one setting of the first device including:
         transmitting first information, regarding the content being watched by the user of the first device, to a second device included in the second network,
         receiving second information, regarding the content, from the second device based on transmitting the first information to the second device, and
         tuning to a channel identified by the second information;
   receiving, by the first device and based on changing the at least one setting, the content from the second network; and
   terminating, by the first device and based on changing the at least one setting and receiving the content from the second network, a connection to the first network.

2. The method of claim 1, where
   the first network is a cellular network, and
   the second network is a home network.

3. The method of claim 1, where changing the at least one setting includes:
   identifying the channel based on a channel identifier included in the second information.

4. The method of claim 1, further comprising:
   activating, based on receiving the second information from the second device, a module,
      the module being associated with the first device, and
      the module being implemented at least partially in hardware;
   receiving, based on activating the module, the content; and
   providing, for presentation, the received content using the identified channel.

5. The method of claim 1, further comprising:
   receiving, when the second network is not available, the content from the first network without receiving the content from the second network.

6. The method of claim 1, further comprising:
   receiving an instruction to switch to the second network;
   terminating, based on receiving the instruction, a connection to the first network;
   establishing, after terminating the connection and when the second network is not available, the connection to the first network; and
   receiving, based on establishing the connection to the first network, the content from the first network without receiving the content from the second network.

7. The method of claim 1, where the content is received from the second network using Wi-Fi.

8. A device comprising:
   a memory to store instructions; and
   a processor to execute the instructions to:

receive content,
   the content being received from a first network,
   the content being watched by a user of the device;
establish, based on determining that a second network is available, a connection with the second network, the second network being different than the first network, and
   the processor, when establishing the connection with the second network, is to change at least one setting of the device,
     the processor, when changing the at least one setting, is to:
       transmit first information, regarding the content being watched by the user of the device, to a second device of the second network,
       receive second information, regarding the content, from the second device based on transmitting the first information, and
       tune to a channel identified by the second information;
receive, based on establishing the connection with the second network, the content from the second network; and
disable, based on changing the at least one setting and receiving the content from the second network, a connection to the first network.

9. The device of claim 8, where
the first network is a cellular network,
the second network is a home network, and
the content is received from the second network using Wi-Fi.

10. The device of claim 8,
where the second information, received from the second device, includes a channel identifier of the channel.

11. The device of claim 8 where the processor is further to:
identify, based on receiving the second information, a channel associated with the content; and
provide, for presentation and based on tuning to the identified channel, the content.

12. The device of claim 8, where the processor, when changing the at least one setting, is to:
provide, for presentation, the content using the identified channel.

13. The device of claim 8, where the processor is further to:
receive, when the second network is not available, the content from the first network without receiving the content from the second network.

14. The device of claim 8, where the processor is further to:
receive an instruction to switch to the second network;
terminate, based on receiving the instruction, a connection to the first network;
establish, after terminating the connection and when the second network is not available, the connection to the first network; and
receive, based on establishing the connection to the first network, the content from the first network without receiving the content from the second network.

15. A non-transitory computer-readable medium storing instructions, the instructions comprising:
one or more instructions which, when executed by a processor of a first device, cause the processor to:
receive content,
   the content being received from a first network,
   the content being watched by a user of the first device;
establish, based on determining that a second network is available, a connection with the second network, the second network being different than the first network, and
   the one or more instructions to establish the connection with the second network including one or more instructions to change at least one setting of the first device,
     the one or more instructions to change the at least one setting including one or more instructions to:
       transmit first information, regarding the content being watched by the user of the first device, to a second device of the second network,
       receive second information, regarding the content, from the second device based on transmitting the first information, and
       tune to a channel identified by the second information;
receive, based on establishing the connection with the second network, the content from the second network; and
terminate, based on changing the at least one setting and receiving the content from the second network, a connection to the first network.

16. The non-transitory computer-readable medium of claim 15, where
the first network is a cellular network, and
the second network is a home network.

17. The non-transitory computer-readable medium of claim 15, where the one or more instructions to change the at least one setting include:
one or more instructions to identify the channel based on a channel identifier included in the second information from the second device; and
one or more instructions to provide, for presentation and based on tuning to the identified channel, the content.

18. The non-transitory computer-readable medium of claim 15, where the one or more instructions to change the at least one setting include:
one or more instructions to provide, for presentation and based on tuning to the channel, the content.

19. The non-transitory computer-readable medium of claim 15, where the one or more instructions to receive the content include:
one or more instructions to stream the content using a cellular network.

20. The non-transitory computer-readable medium of claim 15, where the instructions further include:
one or more instructions to receive an instruction to switch to the second network;
one or more instructions to terminate, based on receiving the instruction, a connection to the first network;
one or more instructions to establish, after terminating the connection and when the second network is not available, the connection to the first network; and
one or more instructions to receive, based on establishing the connection to the first network, the content from the first network without receiving the content from the second network.

\* \* \* \* \*